United States Patent Office 3,832,364
Patented Aug. 27, 1974

3,832,364
AMINATION OF AROMATIC COMPOUNDS IN LIQUID HYDROGEN FLUORIDE
Dale Robert Coulson, Wilmington, Del., assignor to E. I. du Pont de Nemours and Company, Wilmington, Del.
No Drawing. Filed May 25, 1972, Ser. No. 256,770
Int. Cl. C07c 87/50, 97/12
U.S. Cl. 260—378                     26 Claims

ABSTRACT OF THE DISCLOSURE

Disclosed herein is a process for making aromatic amines from benzene or substituted benzene and an aminating agent via direct amination in liquid hydrogen fluoride medium as solvent and catalyst.

BACKGROUND OF THE INVENTION

1. Field of the Invention

This invention relates to a novel process for direct amination of benzene or substituted benzene employing an aminating agent, and hydrogen fluoride as catalyst and solvent.

2. Description of the Prior Art

Heretofore, it has not been known to aminate aromatic hydrocarbons in the presence of hydrogen fluoride. Rather, prior art amination is known with hydroxylamine salts and molar amounts of aluminum chloride as catalyst (Graebe, Chem. Ber., 34, 1778 (1901) and Jaubert, Compt. Rend., 132, 841 (1901)). Hydroxylamine-O-sulfonic acid has also been investigated as an aminating agent in the presence of aluminum chloride (Keller et al., J. Am. Chem. Soc., 66, 1122 (1944); ibid., 68, 899 (1946); Kovacic et al., ibid., 83, 221 (1961); ibid., 84, 759 (1962); ibid., 86, 1588 (1964)). Hydrazoic acid and its salts in the precence of aluminum chloride are known aminating agents (U.S. 1,637,661, Brit. 252,460, and Borsche et al., Chem. Ber., 82, 260 (1949)). A prior art attempt failed to achieve condensation of p-tolylhydroxylamine with phenol in the presence of hydrogen fluoride, Weinmayr, J. Am. Chem. Soc., 77, 1762 (1955). U.S. 2,585,355 teaches introducing amino groups into aromatic compounds employing hydroxylamine and sulfuric acid.

SUMMARY AND DETAILS OF THE INVENTION

This invention concerns a process for making aromatic amines by the direct amination of benzene or substituted benzene comprising reacting said benzene or substituted benzene in a closed vessel with an aminating agent in the presence of hydrogen fluoride medium as catalyst and solvent.

The Aromatic Reactant

Contemplated aromatic compounds used as starting reactants include benzene and substituted benzene, wherein the substituents are selected from one or more of halogen, alkyl of up to 10 carbons, cycloalkyl of 3 to 8 carbons, aralkyl of up to 10 carbons, alkoxy and alkoxyalkyl of up to 10 carbons, phenoxy, carboxyl, nitro, acyl and aroyl of up to 12 carbons, and cycloalkylene of 3 to 5 carbons joining adjacent ring carbons.

Aromatic compounds for amination include durene, toluene, isomers of xylene (o, m and p), isopropylbenzene, phenylcyclopropane, o-, m- and p-diethylbenzene, 1,2,4-trimetthylbenzene, indane, 2- and 5-methylindane, phenylcyclopentane, n - amylbenzene, n - heptylbenzene, phenylcyclohexane, diphenylmethane, 1,2-diphenylethane, 2 - isopropylindane, 4 - isopropylindane, phenylcycloheptane, phenylcyclooctane, Tetralin, 6 - isopropyltetralin, chlorobenzene, bromobenzene, iodobenzene, fluorobenzene, o-, m- and p-dichlorobenzene, anisole, methyl benzyl ether, n-propyl phenyl ether, m-ethyl-anisole, 4-methyldiphenyl ether, di-p-tolyl ether, ethyl 2-cyclohexylphenyl ether, n-heptyl phenyl ether, isobutyl phenyl ether, cyclohexyl phenyl ether, n-octyl phenyl ether, n-octyl p-tolyl ether, n-octyl m-tolyl ether, decyl phenyl ether, 1-benzylethyl heptyl ether, benzoic acid, p-toluic acid, p-chlorobenzoic acid, phthalic acid, nitrobenzene, m-dinitrobenzene, o-, m- and p-nitrotoluene, acetophenone, methyl benzyl ketone, p-methylacetophenone, 3-phenyl-2-butanone, propriophenone, 2-methyl-1-tetralone, phenyl n-butyl ketone, benzophenone, p-methylbenzophenone, di-o-tolyl ketone, phenyl isobutyl ketone, phenyl n-hexyl ketone, phenyl n - undecyl ketone, anthraquinone, 2 - methylanthraquinone, and 1-methyl-4-isopropylanthraquinone.

Preferred aromatic compounds are those containing two or fewer substituents. Especially preferred compounds are those containing two or fewer substituents selected from halogen and alkyl of up to four carbons. Most preferred aromatic compounds for amination are benzene, toluene, and chlorobenzene.

It is noted that the aminating reactants set out below for convenience into "groups" A, B, C, and D, are all operable aminating agents in the novel process. This disclosure in "groups" A, B, C, and D is not meant to imply any process distinctions based upon which group the aminating reagent is chosen from.

The Aminating Reactant

A. Aminating agents suitable for use in this invention include salts of hydroxylamine and N-alkyl and N,N-dialkylhydroxylamines, the alkyl groups containing 1 to 10 carbons, with such inorganic acids as HCl, $H_2SO_4$, $H_3PO_4$, and $HClO_4$ and such lower aliphatic carboxylic acids as acetic, propionic, butyric, isobutyric, pivalic, caproic, caprylic, etc. When N-alkyl and N,N-dialkylhydroxylamines are used, the corresponding N-alkyl and N,N-dialkylamines are obtained. For example, reaction of benzene with N - methylhydroxylamine hydrochloride gives N-methylaniline and reaction with N,N-dimethylhydroxylamine hydrochloride gives N,N-dimethylaniline.

Preferred aminating agents are the salts of hydroxylamine and those of N-alkyl and N,N-dialkylhydroxylamine with 4 or fewer carbon atoms. Especially preferred are salts of hydroxylamine, N-methyl- and N,N-dimethylhydroxylamine with HCl and $H_2SO_4$. Salts with such acids as $HNO_3$ and $H_2SO_3$ are not suitable since the resultant products may react with the aromatic amines formed. In addition such compounds as hydroxylamine-O-sulfonic acid and its alkyl and N,N-dialkyl derivatives are suitable aminating agents.

B. Primary nitroalkanes, $RCH_2NO_2$, where R is hydrogen or alkyl of 1 to 10 carbons, are also suitable aminating agents since they react to form hydroxylamine in situ. For example, amination of benzene, toluene and chlorobenzene with nitromethane gives the corresponding primary aromatic amines. Preferred nitroalkanes are

$C_2H_5NO_2$, $n$-$C_3H_7NO_2$, and $n$-$C_4H_9NO_2$.

C. Aminating agents also include nitric oxide in combination with a tin-containing reducing agent. Although it cannot be said with certainty, it is thought that a hydroxylamine salt is generated by the in situ reduction of the nitric oxide. It has also been found that, for example, nitrosonium bisulfate, $NO^+HSO_4^-$, can be employed as a precursor in place of the nitric oxide.

Representative tin-containing systems suitable as reducing agents for nitric oxide include tin metal itself, stannous oxide, the stannous halides including stannous fluoride, stannous chloride, stannous bromide and stannous iodide, and other stannous salts including salts of organic and inorganic acids. Suitable organic acid ligands include anions of lower alkanoic acids containing up to 8 carbon atoms and anions of aromatic acids derived from benzene or benzene substituted with halo, lower alkyl or additional carboxyl groups, i.e., benzoate, p-toluate, m-toluate, phthalate, isophthalate and p-chlorobenzoate. Suitable inorganic acid ligands include sulfate, phosphate, borate and sulfide. Preferred reducing agents include the stannous halides with stannous chloride being particularly preferred.

D. Although not preferred, lithium, sodium and potassium salts of hydrazoic acid and ammonium azide can be employed.

Hydrogen Fluoride

The amination reaction is normally carried out in substantially anhydrous hydrogen fluoride which serves as catalyst and reaction medium. Although preferred, it is not essential that the hydrogen fluoride be anhydrous and even commercial 48% hydrofluoric acid can be used.

Process Conditions

The reaction is normally carried out in a vessel that is inert to hydrogen fluoride. Vessels based on nickel alloys, or those lined with copper, silver or platinum are preferred.

Normally, no additional solvent other than excess hydrogen fluoride is required for the reaction. It is possible, however, to reduce the quantity of hydrogen fluoride used and to add additional inert solvents as desired. Suitable cosolvents include water, cyclohexane, acetic acid, hexane, heptane, octane and decane, acetone, methyl ethyl ketone, methyl isobutyl ketone, carbon tetrachloride and chloroform.

Molar ratios of 100:1 to 1:100 of aromatic compound to aminating agent are operable and the desired amine reaction products are obtained. Nevertheless, more nearly equal ratios are preferred, for example, ratios of about 2:1 to 1:2 of aromatic compound to aminating agent. Operability at such low ratios of aromatic substrate to aminating agent is an advantage over prior art processes where ratios of about 10 to 1, to 100 to 1, are employed.

Amination of an aromatic compound normally gives a corresponding monoaminated product. It is possible, though, to obtain polyaminated products direct from the starting aromatic compound or by further amination of the intermediate monoaminated product. To accomplish this, a cocatalyst must be added to the system, for example, boron trifluoride. A ratio of about 2 to 1, $BF_3$ to aromatic compound, can be used. Thus, phenylenediamine can be obtained by amination of benzene or by further amination of aniline, and toluenediamine is obtained by amination of toluene or by further amination of intermediate toluidine. Of course, if the polyaminated product is to be made from a nonaminated aromatic compound, then a molar ratio of aminating agent to aromatic compound of at least 2 to 1 is necessary.

The amount of hydrogen fluoride used as a catalyst and solvent is not critical, and a large excess can be used. The yield of amine may be lower at extremely low ratios, and a molar ratio of at least about 2 to 1 of hydrogen fluoride to aminating agent is preferred.

The reaction temperature is not critical and a range of about 50° to 200° C. can be employed. A temperature in the range of about 75° to 175° C. is preferred. A reaction time sufficient to achieve complete amination can vary from less than one hour to several hours.

Reaction pressure is not critical and the amination reaction is usually carried out under the autogenous pressure of the medium. Sufficient pressure is employed to insure that hydrogen fluoride remains in the liquid state during the reaction. Since liquid hydrogen fluoride is a valuable catalyst and solvent, it is desirable to recycle it for reuse. Because of its low boiling point of 19.4° C., HF is easy to distill from the higher boiling aromatic amine reaction products and recover for further use.

Uses for the aromatic amines made by the process of this invention are well known to those skilled in the art. It is well known, for example, to use aromatic amines as dye intermediates, antioxidants, antiozonants, corrosion inhibitors, curing agents for elastomers, intermediates to surfactants, and intermediates for the preparation of isocyanates useful in the preparation of polyurethane foams and elastomers. Polymeric isocyanates, useful as components of rigid foams, are based on aniline. The toluenediamines serve as intermediates to the toluenediisocyanates, particularly useful for the preparation of flexible urethane foams.

DESCRIPTION OF THE PREFERRED EMBODIMENTS

The following Examples are meant to illustrate but not to limit the invention.

Example 1

A mixture of benzene (17.8 ml., 200 mmoles) and stannous chloride (9.45 g., 50 mmoles) was charged to an 80 cc. corrosion resistant pressure bomb. The mixture was cooled to about −80° C. and evacuated to remove air. Hydrogen fluoride (35 g.) was then added and nitric oxide was added to a pressure of 250 lbs./in.$^2$ gauge (p.s.i.g.) (about 19 mmoles NO). The bomb was heated at 150° C. for 3 hours with shaking. The bomb was cooled and the hydrogen fluoride evaporated from the residue over a period of several hours under a nitrogen stream. The residue was treated with 10% aqueous sodium hydroxide solution to liberate the aromatic amine. The resulting mixture was filtered of insolubles, the precipitate washed with ether and the filtrate extracted with ether. The ether extracts were combined, dried over magnesium sulfate, filtered and evaporated on a rotary evaporator. The residue weighed 2.22 g. Gas liquid chromatographic (GLC) analysis (4' x ¼" stainless steel column, 20% octylphenoxypoly(ethylenoxy)ethanol on 60–80 mesh diatomite support) showed the presence of 63% aniline by comparison of the retention time with an authentic sample (78% yield based on moles of nitric oxide charged).

Example 2

A mixture of benzene (8.9 ml., 100 mmoles) and stannous chloride (20.8 g., 110 mmoles) was added to a 240 cc. corrosion resistant bomb. The system was cooled to about −80° C. and evacuated of air. Hydrogen fluoride (35 g.) was added, and nitric oxide was added to a pressure of 200 p.s.i.g. (about 110 mmoles of NO). The bomb was heated at 150° C. for 3 hours with shaking. The bomb was cooled, and the product placed under a stream of nitrogen for several hours to evaporate the hydrogen fluoride. The residue was then neutralized with 10% aqueous sodium hydroxide solution, and the resulting mixture was filtered of insolubles. The residue and filtrate were both washed with ether. The ether layers were combined, dried over magnesium sulfate, filtered and evaporated on a rotary evaporator. The final residue weighed 4.1 g. GLC analysis, as in Example 1, showed the presence of aniline (58%) in the sample.

This Example was repeated except that stannous bromide, stannous oxide, tin metal and stannous fluoride were employed as reducing agents in place of the stannous chloride. The yield of aniline ranged up to 50% based on reducing agent charged with stannous oxide as the reducing agent.

Example 3

A mixture of benzene (17.8 ml., 200 mmoles) and stannous chloride (20.8 g., 110 mmoles) was added to a 240 cc. corrosion resistant bomb. Then hydrogen fluoride (35 g.) and the nitric oxide (about 110 mmoles) were added as in Example 2, and the reaction mixture was heated at 125° C. for 3 hours. The product was treated as in Example 2 to leave 5.48 g. of residual oil. GLC analysis as in Example 1 showed the product to be 70% aniline (a 56% yield based on stannous chloride charged).

Example 4

A mixture of benzene (17.8 ml., 200 mmoles) and stannous chloride (20.8 g., 110 mmoles) was added to a 240 cc. corrosion resistant bomb. Then hydrogen fluoride (5 g.) and nitric oxide (about 110 mmoles) were added as in Example 2 and the reaction mixture was heated at 150° C. for 3 hours. The product was treated as in Example 2 to leave 1.23 g. of residual oil. GLC analysis as in Example 1 showed the oil contained 30% aniline.

Example 5

A mixture of benzene (17.8 ml., 200 mmoles), stannous chloride (20.8 g., 110 mmoles) and cyclohexane (20 ml.) was added to a 240 cc. corrosion resistant bomb. Then hydrogen fluoride (20 g.) and nitric oxide (about 110 mmoles) were added as in Example 2 and the reaction mixture was heated at 150° C. for 3 hours. The product was treated as in Example 2 to leave 1.15 g. of residual oil (72% aniline by GLC analysis).

Example 6

A mixture of benzene (17.8 ml., 200 mmoles), stannous chloride (18.9 g., 100 mmoles) and nitrosonium bisulfate (12.7 g., 100 mmoles) was added to a 240 cc. corrosion resistant bomb. Then hydrogen fluoride (35 g.) was added as in Example 2, and the reaction mixture was heated at 140° C. for 3 hours. The product was treated as in Example 2 to leave 1.89 g. of pale brown oil. GLC analysis as in Example 1 showed the product to be 91% aniline.

Examples 7–10

These Examples were carried out in a 240 cc. corrosion resistant bomb, following the procedure of Example 2. The bomb was charged with 20.8 g. (110 mmoles) of stannous chloride, 35 g. of hydrogen fluoride and 110 mmoles of NO in addition to the aromatic hydrocarbons as shown. It was heated at the reaction temperature for 3 hours and the reaction mixture processed and analyzed as in Example 2.

| Ex. | Aromatic species (mmoles) | Reaction temp. (° C.) | Products |
|---|---|---|---|
| 7 | Chlorobenzene (200) | 150 | Mixed isomers of chloroaniline. |
| 8 | m-Xylene (200) | 125 | Mixed isomers of xylidine. |
| 9 | Nitrobenzene (200) | 150 | Mixed isomers of nitroaniline. |
| 10 | Toluene (200) | 125 | Mixed isomers of toluidine. |

Example 11

A mixture of 85 ml. (800 mmoles) of toluene and 27.8 g. (400 mmoles) of hydroxylamine hydrochloride was placed in a 360 cc. corrosion resistant bomb. Then 140 g. of anhydrous hydrogen fluoride was added and the mixture was heated at 150° C. for 3 hours with shaking. The resulting dark mixture was blown with a stream of nitrogen overnight to remove excess hydrogen fluoride. The thick dark residue was treated with 20% aqueous sodium hydroxide solution until basic (~250 ml.) The mixture was filtered and the filtrate was extracted with 2× 75 ml. of ethyl ether. The ether layers were collected, dried over MgSO$_4$, and filtered. The final filtrate, after evaporation of the ether, gave ~30 g. of a dark oil. This oil was distilled to give a crude fraction of b.p. 95–135° C./15 mm., weighing 13.6 g. This fraction was further distilled to give three fractions as follows:

| Fraction | Boiling point, ° C. | Pressure, mm. | Weight (g.) |
|---|---|---|---|
| 1 | 91–92.5 | 12 | 1.80 |
| 2 | 92.5–94 | 12 | 5.90 |
| 3 | 94–96 | 12 | 4.04 |
| Residue | | | 1.10 |

Fraction 2 was analyzed by GLC on a 12′ x ¼″ column, and 15% 4,4′ - biphenylene-bis-(p-heptyloxy)benzoate) on 60–80 mesh diatomite support was employed. The major component (~78%) coincided with the retention time of p-toluidine. Also, ~20% of a mixture of o- and m-toluidines was shown to be present by GLC retention time.

Finally, fraction 2 was subjected to an elemental analysis.

*Analysis.*—Calcd. for $C_7H_9N$: C, 78.46; H, 8.47; N, 13.07. Found: C, 77.92; H, 7.68; N, 13.02.

Example 12

A mixture of 21.2 ml. (200 mmoles) of toluene, 6.95 g. (100 mmoles) of hydroxylamine hydrochloride and 25 ml. of acetic acid was charged to an 80 cc. corrosion resistant bomb. Then 4 g. (200 mmoles) of anhydrous hydrogen fluoride was added, and the resultant mixture was heated at 150° C. for 3 hours with shaking. The reaction mixture was then mixed with 8 g. (200 mmoles) of sodium hydroxide in 15 ml. of water to neutralize the hydrogen fluoride. The neutralized mixture was evaporated on the rotary evaporator (~15 mm. pressure). The residue was neutralized with 10% sodium hydroxide solution and extracted with 2× 30 ml. of ether. The ether layers were combined, dried over MgSO$_4$ and filtered. The filtrate was evaporated of ether to leave 0.16 g. of an oil. GLC analysis, as in Example 1, revealed the presence of about 80% toluidines in the sample.

Example 13

A mixture of benzene (17.8 ml., 200 mmoles) and hydroxylamine hydrochloride (6.95 g., 100 mmoles) was placed in an 80 cc. corrosion resistant bomb. Then 35 g. of anhydrous hydrogen fluoride was added, and the resulting mixture was heated at 130° C. for 3 hours with shaking. The reaction mixture was evaporated of hydrogen fluoride by passing nitrogen over it for several hours. The residue was then neutralized with ~75 ml. of 10% sodium hydroxide solution and filtered. The filtrate was extracted with 3× 30 ml. of ether, the ether layers were combined, dried over MgSO$_4$ and filtered. The final filtrate was evaporated of ether to leave 5.4 g. of residual product. GLC analysis, as in Example 1, revealed that the sample was 96% to 98% pure aniline (a 58% yield based on hydroxylamine hydrochloride).

Example 14

A mixture of toluene (21.2 ml., 200 mmoles), hydroxylamine hydrochloride (6.95 g., 100 mmoles) and 30 ml. of 48% aqueous hydrofluoric acid was placed in an 80 cc. corrosion resistant bomb. The mixture was heated at 125° C. for 3 hours. This reaction mixture was placed under a stream of nitrogen overnight to evaporate the volatile materials. The solid which resulted was treated with 100 ml. of 10% sodium hydroxide solution to make it basic, was filtered, and the filtrate was extracted with 3× 30 ml. of ether. The ether extracts were combined and dried over MgSO$_4$, filtered and evaporated of ether. The residual oil (1.34 g.) was analyzed by GLC, as in Example 1, and found to contain 75% to 85% mixed toluidines.

Example 15

A mixture of benzene (26.7 ml., 300 mmoles) and hydroxylamine hydrochloride (41.7 g., 600 mmoles) was placed in a 350 cc. platinum-lined bomb. Then 105 ml. of anhydrous hydrogen fluoride was added and the bomb was heated at 160° C. for 5 hours to give a purple liquid (151.55 g.) product. A sample (12.24 g.) of this product was evaporated of volatiles by passing nitrogen through it for several hours. The residue was made basic with 60 ml. of 10% sodium hydroxide solution, the resulting mixture was filtered and the filtrate extracted with 3× 20 ml. of methylene chloride. The methylene chloride layers were combined and dried over MgSO$_4$. Evaporation of the solvent under vacuum gave 2.29 g. of a dark oil. GLC analysis, as in Example 1, revealed the presence of 48% aniline in the oil (a 49% yield based on the benzene charged).

Example 16

A mixture of benzene (17.8 ml., 200 mmoles) and sodium azide (6.50 g., 100 mmoles) was placed in an 80 cc. corrosion resistant bomb. Then 35 g. of hydrogen fluoride was added and the bomb heated at 75° C. for 3 hours. During this time a pressure increase of 50 atmospheres was noted. The resulting product was placed under a nitrogen stream for several hours to evaporate the hydrogen fluoride. The residue was made basic with 10% sodium hydroxide solution and extracted with 3 × 30 ml. of ether. The ether layers were combined, dried over $MgSO_4$, and filtered. The filtrate, after evaporation of the solvent, consisted of 1.80 g. of a light tan oil. GLC analysis revealed the sample to be pure aniline.

Example 17

A solution of benzene (17.8 ml., 200 mmoles) and nitromethane (5.40 ml., 100 mmoles) was placed in an 80 cc. corrosion resistant bomb. Then 35 g. of anhydrous hydrogen fluoride was added, and the bomb was heated at 150° C. for 3 hours with shaking. The resulting product mixture was evaporated of hydrogen fluoride by passage of a nitrogen stream through it. The residue was made basic with 10% sodium hydroxide solution and filtered of insoluble materials. The filtrate was then extracted with 3 × 30 ml. of ether. The ether layers were combined, dried over $MgSO_4$ and filtered. The filtrate was evaporated of ether under vacuum (15 mm.) to give a dark oil (wt.=5.62 g.). GLC analysis revealed the sample to be 58% aniline (a 35% yield based on nitromethane charged).

Example 18

A mixture of anthraquinone (20.8 g., 100 mmoles) and hydroxylamine hydrochloride (10.45 g., 150 mmoles) was placed in an 80 cc. corrosion resistant bomb. Then 35 g. of anhydrous hydrogen fluoride was added, and the bomb was heated at 150° C. for 3 hours with shaking. The resultant red-brown product mixture was evaporated of hydrogen fluoride by passage of a nitrogen stream through it for several hours. The red-brown solid was made basic with 10% sodium hydroxide solution and filtered. The filtrate was discarded. The residue was washed with 3 × 50 ml. of hot water to dissolve any inorganic salts and dried, wt., 36.0 g. GLC analysis (265° C., 4′ x ¼″ glass column with 10% polymeric hydrocarbon on 60–80 mesh diatomite support) revealed the following composition:

| Constituent: | Percent yield or recovery |
|---|---|
| Anthraquinone | 15.6 |
| 1-Aminoanthraquinone | 14.6 |
| 2-Aminoanthraquinone | 21.5 |

The product yields are based on anthraquinone charged. Total yield of aminoanthraquinones based on the anthraquinone reacted is 42.8%.

Example 19

A mixture of 17.8 ml. (200 mmoles) of benzene, 6.95 g. (100 mmoles) of hydroxylamine hydrochloride and 20 ml. of cyclohexane was added to an 80 cc. corrosion resistant bomb. Then 15 g. of hydrogen fluoride was added, and the bomb was heated at 150° C. for 3 hours with shaking. At the end of this time the cooled mixture was treated with a stream of nitrogen gas to remove volatiles, and the residue was made basic (pH ~12) with 20% sodium hydroxide solution. The mixture was filtered and the filtrate extracted with ethyl ether (2 × 75 ml.). The ether layers were combined, dried over magnesium sulfate, and filtered. The ether layer was evaporated on a rotary evaporator to leave 3.50 g. of an oil. GLC analysis showed the sample to contain 79% aniline.

Examples 20 to 37

These Examples were carried out as in Example 13 with the exceptions noted below. The reactor was charged with 35 g. of anhydrous hydrogen fluoride in addition to the reagents shown. All reactions were run for 3 hours, and yields are calculated based on the limiting reagent charged.

| Example | Aromatic species (mmoles) | Aminating agent (mmoles) | Temp. (° C.) | Products (percent yield) |
|---|---|---|---|---|
| 20 | Benzene (200) | $NH_2OH \cdot HCl$ (100) | 150 | Aniline (78). |
| 21 [a] | do | $NH_2OH \cdot HCl$ (200) | 150 | Aniline (32). |
| 22 | Benzene (100) | $NH_2OH \cdot HCl$ (100) | 150 | Aniline (62). |
| 23 | do | $NH_2OH \cdot \frac{1}{2}(H_2SO_4)$ (100) | 150 | Aniline (41). |
| 24 | Benzene (200) | $CH_3NHOH \cdot HCl$ (100) | 150 | N-methylaniline (63). |
| 25 | Toluene (200) | $NH_2OH \cdot HCl$ (100) | 150 | Mixed isomers of toluidine (70.4). |
| 26 | do | $NaN_3$ (100) | 75 | Mixed isomers of toluidine (35.4). |
| 27 | do | $CH_3NO_2$ (100) | 125 | Mixed isomers of toluidine (14.4). |
| 28 | Chlorobenzene (200) | $NH_2OH \cdot HCl$ (100) | 150 | Mixed siomers of chloroaniline (71.4). |
| 29 | m-Xylene (200) | $NaN_3$ (100) | 75 | Mixed isomers of xylidene (44.4). |
| 30 | do | $CH_3NO_2$ (100) | 150 | Mixed isomers of xylidene (57.2). |
| 31 | Anisole (200) | $NH_2OH \cdot HCl$ (100) | 150 | Mixed isomers of anisidine (1.3). |
| 32 | do | $NaN_3$ (100) | 75 | Mixed isomers of anisidine (38.6). |
| 33 [b] | Aniline (100) | $NH_2OH \cdot HCl$ (100) | 150 | Mixed isomers of phenylenediamine (8.0). |
| 34 | Nitrobenzene (200) | $NH_2OH \cdot HCl$ (100) | 150 | Mixed isomers of nitroaniline (16.7). |
| 35 | p-Xylene (200) | $NH_2OH \cdot HCl$ (100) | 150 | Mixed isomers of xylidene (3.3). |
| 36 | Chlorobenzene (200) | $CH_3NO_2$ (100) | 150 | Mixed isomers of chloroaniline (38.6). |
| 37 | o-Xylene (200) | $NaN_3$ (100) | 75 | Mixed isomers of xylidine (56.9). |

[a] Only 20 g. of hydrogen fluoride was used.
[b] A cocatalyst ($BF_3$, 200 mmoles) was added to this reaction.

What is claimed is:

1. A process for aminating aromatic compounds comprising reacting
   an aromatic compound selected from benzene, anthraquinone and substituted benzene, wherein the substituents are selected from up to two of halogen, alkyl and alkoxy of up to 4 carbons, nitro, and amino with
   an aminating agent selected from at least one of
   (A) acid salts of hydroxylamine, N-alkylhydroxylamine, and N,N-dialkylhydroxylamine, said alkyl groups having 1 to 10 carbons,
   (B) primary nitroalkanes, $RCH_2NO_2$, where R is hydrogen or alkyl of 1 to 10 carbons,
   (C) nitric oxide and nitric oxide precursors, with a reducing agent, and
   (D) lithium, sodium and potassium salts of hydrazoic acid and ammonium azide,
   in the presence of hydrogen fluoride liquid in a closed vessel at a temperature of 50° to 200° C. and sufficient pressure to maintain the hydrogen fluoride in the liquid state.

2. A process according to Claim 1 wherein the aromatic compound is anthraquinone.

3. A process according to Claim 1 wherein the aromatic compound is benzene.

4. A process according to Claim 3 wherein the aminating agent is selected from at least one of acid salts of hydroxylamine, N-alkylhydroxylamine, and N,N-dialkylhydroxylamine, said alkyl groups having 1 to 10 carbons.

5. A process according to Claim 4 comprising reacting benzene with hydroxylamine hydrochloride in the presence of hydrogen fluoride.

6. A process according to Claim 4 comprising reacting benzene with methylhydroxylamine hydrochloride in the presence of hydrogen fluoride.

7. A process according to Claim 3 wherein the aminating agent is selected from at least one of primary nitroalkanes, $RCH_2NO_2$, where R is hydrogen or alkyl of 1 to 10 carbons.

8. A process according to Claim 7 comprising reacting benzene with nitromethane in the presence of hydrogen fluoride.

9. A process according to Claim 3 wherein the aminating agent is selected from at least one of nitric oxide and nitric oxide precursors, with a reducing agent.

10. A process according to Claim 9 wherein the reducing agent is selected from the group tin metal, stannous oxide, stannous halide, stannous salts of organic acids, and stannous salts of inorganic acids.

11. A process according to Claim 10 comprising reacting benzene with nitric oxide and stannous chloride in the presence of hydrogen fluoride.

12. A process according to Claim 10 comprising reacting benzene with nitrosonium bisulfate and stannous chloride in the presence of hydrogen fluoride.

13. A process according to Claim 3 wherein the aminating agent is selected from at least one of lithium, sodium and potassium salts of hydrazoic acid and ammonium azide.

14. A process according to Claim 13 wherein the aminating agent is a sodium salt of hydrazoic acid.

15. A process according to Claim 14 comprising reacting benzene with sodium azide in the presence of hydrogen fluoride.

16. A process according to Claim 1 wherein the aromatic compound is substituted benzene containing up to two substituents.

17. A process according to Claim 16 comprising reacting toluene with hydroxylamine hydrochloride in the presence of hydrogen fluoride.

18. A process according to Claim 2 comprising reacting anthraquinone with hydroxylamine hydrochloride in the presence of hydrogen fluoride.

19. A process according to Claim 16 comprising reacting chlorobenzene with hydroxylamine hydrochloride in the presence of hydrogen fluoride.

20. A process according to Claim 16 comprising reacting xylene with nitromethane in the presence of hydrogen fluoride.

21. A process according to Claim 16 comprising reacting anisole with sodium azide in the presence of hydrogen fluoride.

22. A process according to Claim 16 comprising reacting nitrobenzene with hydroxylamine hydrochloride in the presence of hydrogen fluoride.

23. A process according to Claim 1 wherein the molar ratio of aromatic compound to aminating agent is between about 2:1 to 1:2, and the molar ratio of hydrogen fluoride to aminating agent is at least 2 to 1.

24. A process for forming phenylenediamine, comprising reacting benzene with hydroxylamine hydrochloride in the presence of hydrogen fluoride and boron trifluoride at a molar ratio of hydroxylamine hydrochloride to benzene of at least 2 to 1 in a closed vessel at a temperature of 50° to 200° C. and sufficient pressure to maintain the hydrogen fluoride in the liquid state.

25. A process for forming toluene-diamine, comprising reacting toluene with hydroxylamine hydrochloride in the presence of hydrogen fluoride and boron trifluoride at a molar ratio of hydroxylamine hydrochloride to toluene of at least 2 to 1 in a closed vessel at a temperature of 50° to 200° C. and sufficient pressure to maintain the hydrogen fluoride in the liquid state.

26. A process for forming phenylene-diamine, comprising reacting aniline with hydroxylamine hydrochloride in the presence of hydrogen fluoride and boron trifluoride in a closed vessel at a temperature of 50° to 200° C. and sufficient pressure to maintain the hydrogen fluoride in the liquid state.

References Cited

UNITED STATES PATENTS

| 1,564,631 | 12/1925 | Schmidt | 260—578 |
|---|---|---|---|
| 1,637,661 | 8/1927 | Schmidt et al. | 260—578 |
| 2,401,525 | 6/1946 | Turski | 260—378 |
| 2,585,355 | 2/1952 | Turski | 260—378 |

OTHER REFERENCES

Olah: Friedel-Crafts and Related Reactions, Interscience, New York (1963–65), vol. 1, pp. 201–366 and 853–81; vol. 3, pp. 1493–1506.

Chemical Abstracts, 13907c, vol. 59 (1963).

Kovacic et al.: Journal of the American Chemical Soc., vol. 86, pp. 1588–92 (1964).

Hoop et al.: Journal of the Chemical Soc. (London), pp. 4685–87 (1961).

LORRAINE A. WEINBERGER, Primary Examiner

P. J. HAGAN, Assistant Examiner

U.S. Cl. X.R.

260—378, 518 R, 518 A, 570 R, 570 AB, 571, 575, 578